June 23, 1936.    I. H. FOWLE    2,045,183
FROZEN CONFECTION PACKAGE
Filed June 29, 1934    2 Sheets-Sheet 1
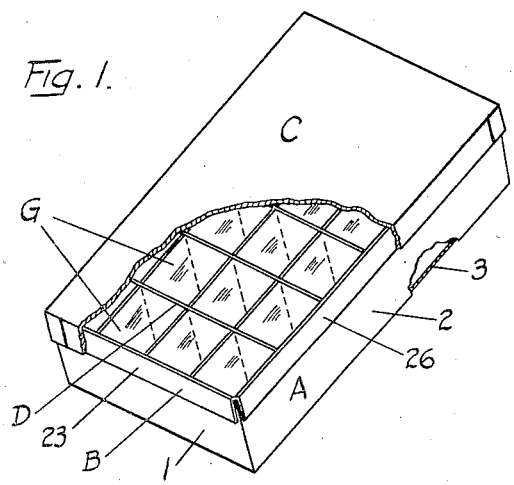
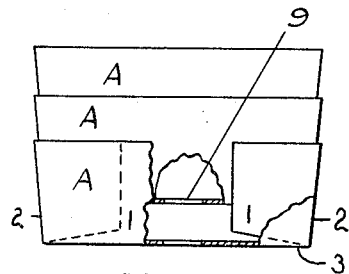
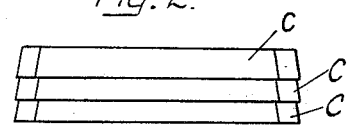
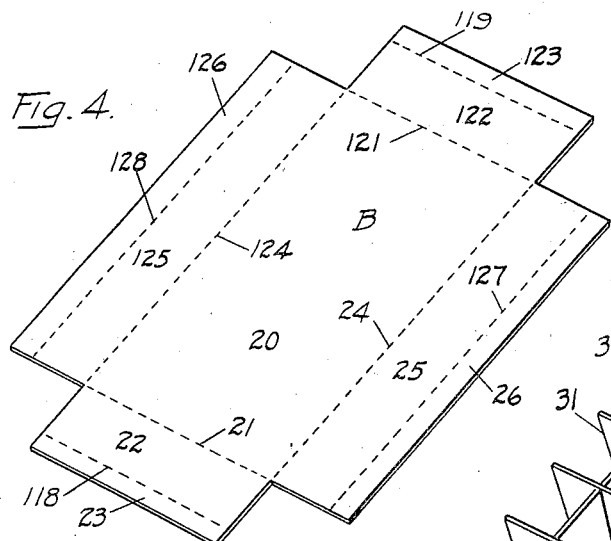
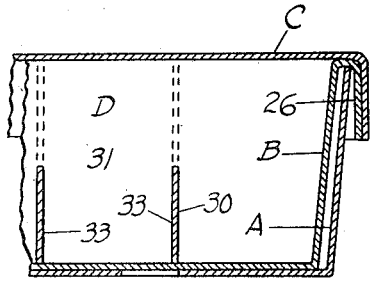
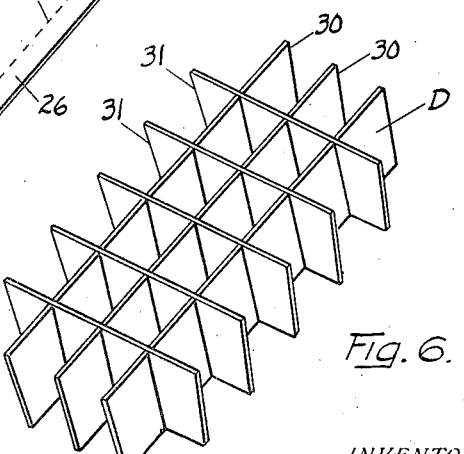
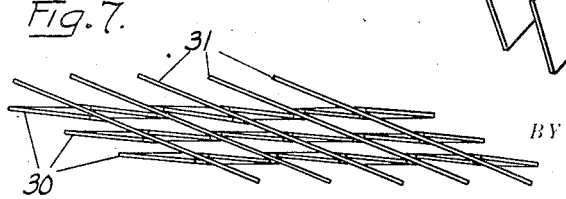
INVENTOR
Irving H. Fowle
BY
Gardner D. Pearson
ATTORNEY June 23, 1936.    I. H. FOWLE    2,045,183
FROZEN CONFECTION PACKAGE
Filed June 29, 1934    2 Sheets-Sheet 2
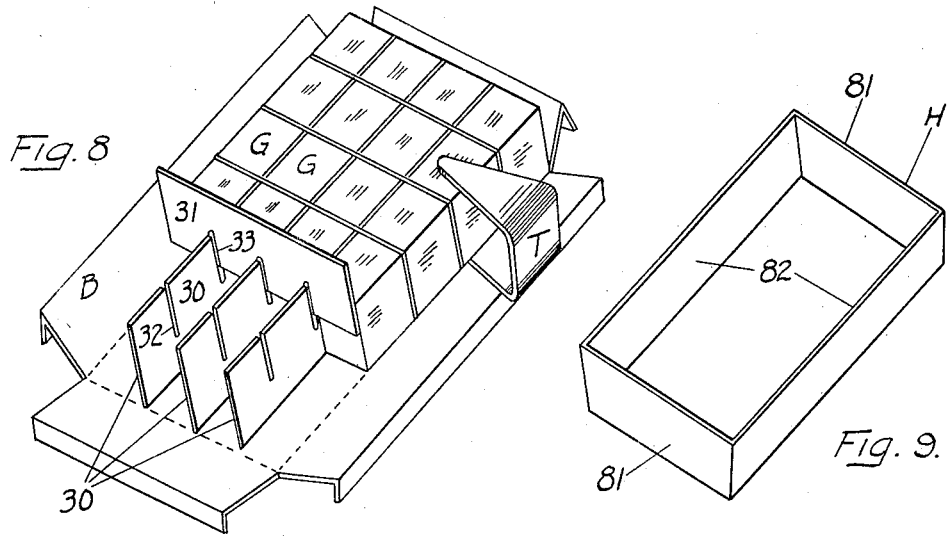
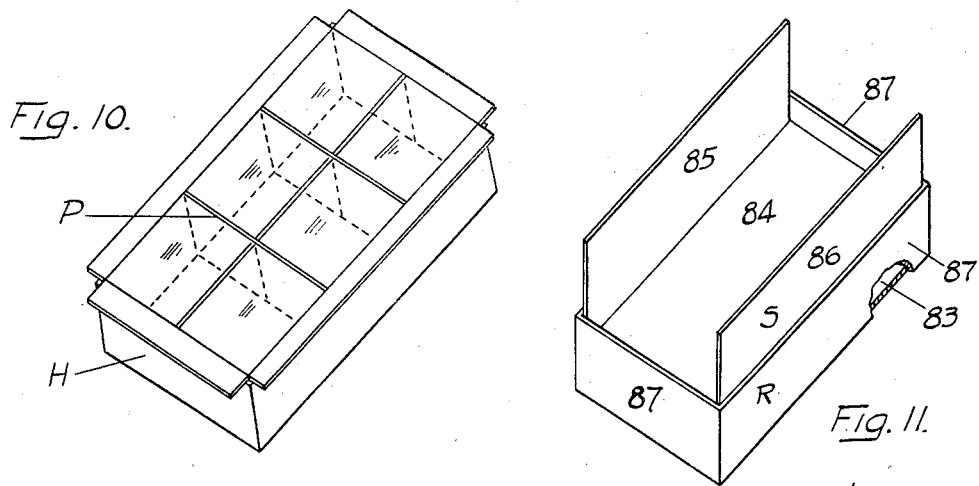
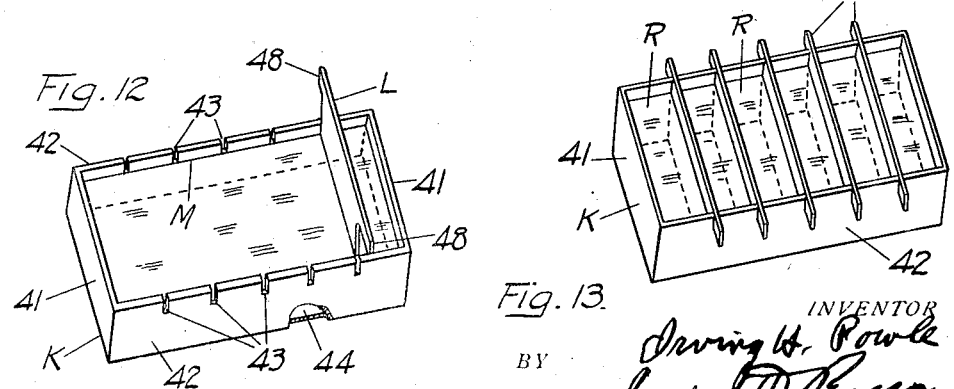

Patented June 23, 1936

2,045,183

UNITED STATES PATENT OFFICE 2,045,183

FROZEN CONFECTION PACKAGE

Irving H. Fowle, Dorchester, Mass., assignor, by mesne assignments, to William R. Warner & Co., Inc., New York, N. Y., a corporation of Delaware Application June 29, 1934, Serial No. 733,059

5 Claims. (Cl. 99—180)

This invention relates to shipping and selling packages for ice cream and other frozen confections.

Formerly ice cream, sherbet and such confections were shipped in containers of various shapes often packed in ice, but more recently it has been shipped in blocks of parallelepiped form each wrapped up in paper, a series of these blocks being packed together and kept cold either by ice or in iceless refrigerators. Ice cream has been also shipped and sold in the form of what are known as Eskimo pies which consist of a frozen cream surrounded by chocolate or something of that sort and ice cream has also been sold in balls carried by edible cones.

The purpose of this invention is to provide a package in which frozen cream can be shipped which will fill the package completely without air holes and in regular forms such as cubes and to have such a package from which the cubes can be taken as by tongs, such package being at all times sanitary, compact and convenient. Such a package must be so arranged that each cube can readily be separated from the container while retaining its form and without disturbing the other cubes.

Instead of cubes, many other forms of prisms may be formed.

The cubes must come in contact with their container and the material of the container must be such that the confection even when frozen very hard will not stick.

On account of the expense and for many other reasons, a container of metal which is a good conductor of heat is not desirable and the container should not be of absorbent paper or any material which will become soft in case there is a slight melting or if it comes in contact with damp air.

I, therefore, preferably make my container of thin cardboard or paper board impregnated with paraffin or some other kind of wax. The frozen confection will not stick to such waxed paper board and it is so cheap that it can be thrown away after use.

It is also highly necessary that such containers should be of such character that the parts can either be folded flat or nested, but at the same time easily assembled and so arranged that the parts will not separate nor be pulled apart in handling or shipping.

It consists substantially of an outer casing of assembled box form with the sides slightly flaring so that they can be shipped nested, a cover of assembled box shape with the sides slightly flaring so that they can be nested for shipping, an inner casing in the form of a Greek cross with a bottom and four sides, such casing being suitably creased so that they can be easily bent, there being a tongue at the end or top of each side, the whole being arranged to ship flat, and a cellular interior including two rows of partitions which cross each other, the partitions of one row being so arranged that they can be individually lifted out.

In the drawings, Fig. 1 is an isometric view of a complete package.

Fig. 2 is an end view showing a nest of outer casings.

Fig. 3 is an end view showing a nest of covers.

Fig. 4 is an isometric view showing an inner casing laid out flat as it is while being shipped.

Fig. 5 is a vertical sectional view taken along the nearest face of one of the dividing partitions.

Fig. 6 is an isometric view of a preferred form of dividing member and

Fig. 7 is a plan view of such a dividing member folded flat for shipping.

Fig. 8 is an isometric view showing an inside casing removed from the outside casing and cover with the sides bent down and with several partitions removed together with one partition partly removed and a set of tongs to show how the prisms can be removed in a sanitary manner.

Fig. 9 is an isometric view of a modified form of outer casing.

Fig. 10 is an isometric view of a modified form of package.

Fig. 11 is an isometric view of a modified form of inner and outer casing.

Fig. 12 is an isometric view of a modified form of outer casing or box showing a partition being pushed in place and Fig. 13 is an isometric view of a modified form of complete package ready for shipping.

In Figs. 1 to 8 of the drawings is represented the preferred form of package as used for shipping ice cream or a similar frozen article.

A represents an oblong box of rigid or semi-rigid construction having the sides 2, 2 and ends 1, 1 as well as a bottom 3 all of which are fixed firmly together, the sides and ends being so cut and fastened that, as shown in Fig. 2, a number of these boxes can nest one in the other when being shipped. This box A, I will call the outer casing and while it preferably is made of waxed paper board, it may be made of any suitable cheap material which preferably can be thrown away after the frozen confection in the package has been used. It might even be made of wood or metal.

B represents what I will call the folded inner casing and this should be made of waxed paper board or of some other material which can be shipped flat and when assembled in the package can be folded on suitable creases and which when the package is used can be again unfolded.

It is formed from a blank in the form of a cross with a center 20 shown as of rectangular shape, with side wings 25, 26 and 125, 126 which can be bent up from the creases 24 and 124 and which have tips 26 and 126 which can be bent out and down at the creases 127 and 128 over the sides of the outer casing A when the parts are assembled. 22, 23 and 122, 123 are similar end sides bent up at 21 and 121 and down and over at 119 and 118.

Preferably all the sides of the inner casing B slope outwardly and the ends when bent out and down tend to slope out and serve not only to hold inner casing B in place, but also to keep the cover C in position, cover C preferably having sides which slope out slightly, as shown in Fig. 3, so that they can properly nest. However, if a cover with straight sides at right angles to the top was used, these ends would help to hold such cover in place also.

D is a dividing member also preferably of waxed paper board made up of parallel rows 30, 30 across which extend other parallel rows 31, 31, the partitions in the rows being locked together by means of the slots 33 which extend up from 31 and 32 which extend down from 30. By this construction, any one of the partitions such as 31 can be lifted out thus facilitating the removal of each prism or tube of confectionery for sale.

In forming the ice cream package at the ice cream factory, an inner casing B has its sides folded up with their ends folded down and this is placed in an outer casing A. This combination casing is then filled with the semi-liquid thoroughly mixed and partly frozen ice cream in the condition known as the commercial mix where it will flow and seek its own level.

This level should be close to the top of the combined casing.

The cellular divider D is now pushed down into the cream until it reaches the bottom of the combined casing and then the cover C is put on after which this box with others is placed in the hardening refrigerator at a temperature which runs well down towards zero and the whole mass is there frozen together.

The packages are shipped in this condition, put in a store refrigerator and, when needed for use, a package is taken out, the cover removed, the outer casing A removed, the sides or one side of the inner casing bent down after which any particular prism which is exposed can be taken out as by tongs T. To facilitate this removal, any one of the partitions such as 31 can be lifted up to expose the next row of prisms, as shown in Fig. 8.

Of course, other confections such as sherbet or even water could be used instead of ice cream in this package and there are various modifications such as the following:

As shown in Fig. 9, the outer casing H can be made with four sides 81, 81, and 82, 82 and no bottom, these sides preferably flaring outward so that the inner casing will not drop through. However, a band with edges at 90° could be used if an inner casing of which the ends of the sides were bent over was used as these ends would hold it in place. Such a package is shown in Fig. 10.

While the edges of the dividing member D in Figs. 1 to 8 preferably slope outwardly, to conform with the inner and the outer casing, as the shape of the inner casing B will conform to that of the outer casing, whether A or H, in Fig. 10 is shown a dividing member P in which there are two transverse partitions and one lengthwise partition, the edges of which are vertical to conform to the inner shape of outer casing H.

As shown in Fig. 11, an outer casing R with four vertical sides 87 and a bottom 83 can be used with an inner casing S which has a bottom 84 and two ends 85 and 86. These can be used with any kind of a dividing member.

If desired, a box such as K with four vertical sides 41, 41, 42, 42 and a bottom 44 and with slits 43 on opposite sides of the top can be used and this can be filled with the semi-frozen substance M after which a number of partitions indicated by L become the dividing members, these partitions having at each end, at the top, ears 48 which set down into the slots 43 and hold the partitions in place while the shipping package is being assembled. These partitions can be removed one at a time and, if desirable, the vertical edges of box K can be cut or torn down to expose the prisms of frozen confection on the inside indicated by R, R.

Where the outer casing such as A or K is used, preferably it is pierced with a finger hole or holes such as 9 through which the inner casing can be pushed out.

I claim:

1. A frozen confection package comprising an outer casing made of waxed paper board including a bottom and four sides which slant outward therefrom and are connected, said bottom having an opening hole; combined with a folded inner casing of waxed paper board which includes a bottom and sides which slant outwardly therefrom, the upper ends of some of the sides being bent out, and down over the sides of the outer casing, said inner casing fitting loosely in the outer casing; an inside dividing member of waxed paper board including parallel rows of dividing partitions across which extend rows of other dividing partitions, the partitions being so made that those of one row can be lifted from those of the other row; and a frozen confection which fits closely the cells of the dividing member and in the inner casing.

2. A frozen confection package comprising an outer casing made of waxed paper board including a bottom and four sides which are connected; combined with a folded inner casing of waxed paper board which includes a bottom and sides, the upper ends of some of the sides being bent out, and down over the sides of the outer casing, said inner casing fitting in the outer casing; an inside dividing member of waxed paper board including parallel rows of dividing partitions; and a frozen confection which fits closely the cells of the dividing member and in the inner casing.

3. A frozen confection package comprising an outer casing including a bottom and four sides which are connected; combined with a folded inner casing of waxed paper board which includes a bottom and sides, said inner casing fitting in the outer casing; an inside dividing member of waxed paper board including parallel rows of dividing partitions; and a frozen confection which fits closely the cells of the dividing member and in the inner casing.

4. A frozen confection package comprising an outer casing including four sides which are connected; combined with a folded inner casing of waxed paper board which includes a bottom and sides, the upper ends of some of the sides being bent out, and down over the sides of the outer casing, said inner casing fitting in the outer casing; an inside dividing member of waxed paper board including dividing partitions; and a frozen confection which fits closely the cells of the dividing member and in the inner casing.

5. A frozen confection package comprising an outer casing including four sides which are connected; combined with a folded inner casing of waxed paper board which includes a bottom and sides, said inner casing fitting in the outer casing; an inside dividing member of waxed paper board; and a frozen confection which fits closely the cells of the dividing member and in the inner casing.

IRVING H. FOWLE.